Nov. 3, 1953

J. S. HARRIS 2,658,167

SIGNAL LEVEL INDICATOR

Filed Aug. 28, 1952

INVENTOR.
JAMES S. HARRIS
BY *Morris Liebman*
ATTORNEY

Patented Nov. 3, 1953

2,658,167

UNITED STATES PATENT OFFICE 2,658,167

SIGNAL LEVEL INDICATOR

James S. Harris, Old Greenwich, Conn., assignor to Radio Corporation of America, a corporation of Delaware Application August 28, 1952, Serial No. 306,880

10 Claims. (Cl. 315—201)

This invention relates broadly to signal level indicators, and more specifically to a signal level indicator by means of which a signal voltage may be compared with a reference voltage of predetermined value. While not specifically limited thereto, the signal level indicator of the present invention is particularly useful for indicating the signal level of a tone signal converter, the output of a tone keyer, or the aggregate signal level on a communication channel carrying a signal such as a tone.

The usual method of comparing a signal voltage with a fixed reference voltage in a system is to connect a meter, of the moving coil type, between the two points in the system representative of the signal voltage and the reference voltage, respectively. In addition to the expense of this meter and the difficulty of determining the exact point of balance in the usual case, an objection to such instruments is that there are at least three conditions which may lead an observer to the erroneous conclusion that the signal voltage is equal to the reference voltage. For instance, if any of the tubes fail or any connections in the circuit are open the meter will read zero. Also, a failure of the power supply voltage, or meter burn out, will result in a zero reading on the meter.

In the invention to be described, small neon or other gas type lamps are used as indicators. These have the advantage of being inexpensive and, when properly protected against excessive current, have a relatively long life. Neon lamps, for instance, are not normally subject to sudden failure but indicate the need for replacement by a gradual darkening rather than by a complete burn out.

It is accordingly a principal object of the present invention to provide an improved signal level indicator.

It is a further object of the present invention to provide an improved signal level indicator, employing gas type lamps, which is relatively failsafe as compared to circuits using a moving coil type meter.

Another object of the present invention is to provide an improved signal level indicator using a circuit which compensates for any non-uniformity of the gas type lamps employed.

Still another object of the present invention is to provide an improved, inexpensive and reasonably accurate signal level indicator which is simple in construction and operation, which renders protection against erroneous interpretation, and which is highly efficient in use.

According to the invention, these and other objects and advantages are attained in an improved signal level indicator comprising a differential amplifier circuit using a pair of electron tubes operating under conditions of substantially constant current. The cathodes of the tubes are connected to a common impedance and in the anode circuit of each tube is a neon or gas type lamp. A source of unidirectional potential is applied across the anode-cathode circuit of each tube. The grid of one tube is supplied with a fixed reference potential. The signal voltage, whose level is to be determined, is applied to the grid of the other tube. If the level of the signal voltage is within an adjusted db (decibel) range of the reference voltage both neon lamps will be lighted. If the level or the signal voltage is above or below the adjusted db range of the reference voltage, only one or the other neon lamp will be lighted, thus indicating whether the signal is above or below the desired, adjusted db range.

Gas type lamps usually exhibit considerable non-uniformity between samples of the same type. This is especially true with respect to the firing potential of these lamps, and previous circuits using these lamps were considered unsatisfactory because of their inherent non-uniformity. In accordance with the circuit of the present invention, the effects of such non-uniformity are minimized and will normally be inconsequential in the contemplated usages of the circuits.

For a more detailed understanding of the invention reference is made to the accompanying drawings, in which similar reference characters are applied to similar elements, and in which.

Figure 1:
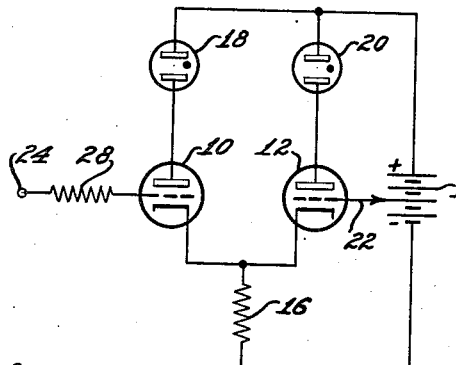
Fig. 1 is a schematic drawing of a signal level indicator in accordance with the present invention.

Referring more particularly to Fig. 1, there is shown the signal level indicator in accordance with the present invention comprising a differential amplifier having a pair of electron discharge tubes 10 and 12. The cathodes of the tubes 10, 12 are connected to the negative terminal of a source of unidirectional voltage 14 through a common biasing resistor 16. The resistor 16 is a common impedance for the cathode circuits of the tubes 10, 12. Connected between the positive terminal of the voltage source 14 and the anode of the tube 10 is a current responsive device such as a gas type lamp 18. A lamp 20, similar to the lamp 18, is connected between the positive terminal of the voltage source 14 and the anode of the tube 12. A reference voltage of suitable value may be applied to the grid of the tube 12 by connecting the latter to a suitable voltage of the voltage source 14 through a variable tap 22. The signal, whose voltage level is to be determined, is applied to input terminals 24, 26. The signal, applied to the grid of the tube 10 through a current limiting resistor 28, must be a D.-C. voltage. A. C. signals may be handled if they are rectified before they are applied to the grid, in a manner well known in the electronic art.

If the potential difference between the negative terminal of the voltage source 14 and the reference voltage is fairly large, that is several times as great as the negative control potential required to cut off the anode current in either of the tubes 10 or 12, and if the resistance 16 and the impedances of the lamps 18, 20 are of suitable values, considering the supply voltage 14 and the reference voltage applied to the grid of the tube 12, it will be found that the amplitude of the signal voltage applied to the grid of the tube 10 will be the major factor in the determination of the values of anode current passed between tubes 10, 12. Under these conditions the difference in the impedances between lamps 18 and 20 caused by any non-uniformity therebetween, will have little or no effect on the values of the anode current. Within these limitations, it has been observed that for any given signal and reference voltages the tubes 10, 12 function as constant current tubes and that neither the plate load resistance nor the hand-book values of the tube plate resistance are of any great consequence. Under these conditions, the tubes 10, 12 compensate for any change in plate load resistance by an opposite change in plate resistance, thus maintaining a constant total resistance between the tube cathodes and the positive terminal of the voltage source 14. It will be understood that the division of current between the anode circuits of the tubes 10 and 12 is determined wholly by the relative potential difference between the signal and reference voltages applied to the tubes 10 and 12, respectively.

The operation of the signal level indicator, as shown in Fig. 1, will now be explained. When the signal voltage applied to the grid of the tube 10 equals the reference voltage applied to the tube 12, the anode currents in each tube will be equal, and both of the lamps 18 and 20 will be lighted. If the signal voltage is sufficiently negative with respect to the reference voltage, the tube 10 will cease to pass current while the tube 12 will conduct an increased current therethrough, and the lamp 20 will glow with increased intensity while the lamp 18 will be extinguished. If the signal voltage is sufficiently positive with respect to the reference voltage, then the lamp 20 will be extinguished and the lamp 18 will glow brightly. It will be noted that, regardless of the level of the signal voltage applied to the tube 10, either one or both of the neon lamps will be lighted. In this respect, the signal level indicator, in accordance with the present invention, is fail-safe. If a meter of the moving coil type were to be hooked across the anodes of the tubes 10, 12 in order to indicate the difference in voltage at these points, the meter would read zero if the signal voltage applied to the tube 10 were equal to the reference voltage applied to the tube 12 assuming that the anode impedances of the tubes 10, 12 are equal. A zero reading on the meter, however, would also be caused by a failure of either of the tubes 10, 12, a failure of the power supply 14, or a burn out in the meter itself. Under the latter conditions, an operator reading the meter could never be absolutely sure that the signal level indicator circuit is functioning properly. In accordance with the present invention, when the signal voltage is equal to the reference voltage, both of the lamps 18 and 20 are lighted, thus indicating a proper functioning of the signal level indicator. If both of the lamps 18 and 20 were extinguished, they would definitely indicate a fault in the signal level indicator since under no conditions of the level of the signal voltage should both of the lamps 18 and 20 be extinguished.

It was previously mentioned that the gas type lamps 18 and 20 may be somewhat non-uniform in characteristics. As explained above, however, the circuit as shown in Fig. 1 has the effect of determining the current flow through the lamps 18, 20 without regard to their uniformity and thus the ignition and extinction voltage characteristics of these lamps lose their significance in determining the accuracy of the circuit. Therefore, quite definite limits can be determined for the required potential differences between the signal and the reference voltages to just ignite or just extinguish either of the two lamps, and if both lamps are lighted the potential differences are immediately known to be within established limits. In many instances, the indication of both lamps lighted will be sufficiently accurate for the requirement. However, at either of the limits, it is obvious that one lamp will be at practically maximum intensity while the other will be at much less intensity, and that a closer balance between the signal and the reference voltage will produce a condition of equal intensity of the two lamps. Fortunately, the point of equal intensity, as observed by the eye, represents approximately equal current in two lamps of the same type so that an adjustment that produces equal intensity is a close indication of balance between the signal and the reference voltage.

It is evident that, for a given gas tube type, the potential difference required to reach the two extinction points is determined by the tube design characteristics, and is relatively constant over a wide range of absolute values of signal and reference voltages. Thus the larger the absolute values, the smaller the percentage between the two voltages will be for the condition under which both lamps will be lighted. If the absolute values are fixed for a given requirement, the higher the amplification factor of the tubes used, the smaller will be the allowable difference between the signal and the reference voltages for both lamps to be lighted. Thus, in actual practical circuits, the designer can design the circuit to practically any accuracy required. A further advantage which accrues from a circuit of this type is the fact that it can utilize triode tubes operating as essentially constant current tubes. Under these conditions, the tube's service life is lengthened and the transconductance can drop considerably before the circuit is appreciably affected. While triodes may be preferable in the use of these circuits, multi-element tubes may also be used in a manner well known in the art.

Figure 2:
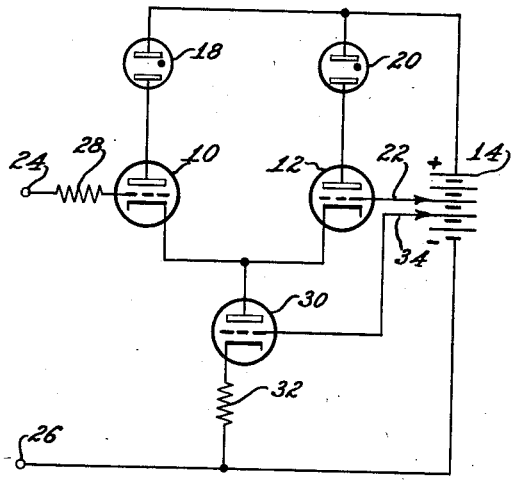
Fig. 2 is a schematic diagram of a modified form of the signal level indicator of Fig. 1.

In certain instances, as when the signal voltage applied to the grid of the tube 10 is excessively large, the characteristic of the circuit shown in Fig. 1 that produces a maximum current in the tube 10 will be undesirable. If the signal voltage is excessive, the grid of the tube 10 tends to draw more current than is desired. In such cases, the cathode resistance 16 may be replaced by an electron tube functioning as a constant current device, as shown in Fig. 2. With reference to Fig. 2, there is shown a signal level indicator similar to the signal level indicator of Fig. 1 except that the common cathode circuit of the tubes 10, 12 comprises an electron tube 30 having its anode connected to the cathodes of the tubes 10, 12, and its cathode connected to the negative terminal of the voltage supply 14 through a cathode resistor 32. The grid of the tube 30 is connected to a source of suitable unidirectional voltage supply 14 through a tap 34. With the circuit designed for a certain reference voltage, the tap 34 may remain fixed. The operation of the signal level indicator shown in Fig. 2 is the same as that described for the circuit of Fig. 1 except for the fact that an excessive signal voltage applied to the grid of the tube 10 will not cause an excessive amount of current flow in the anode cathode circuit of the tube 10. The excessive current is prevented because of the degeneration resulting from the cathode resistor 32 in the cathode circuit of the tube 30. Under these conditions, the tube 30 acts as a constant current tube.

Figure 3:
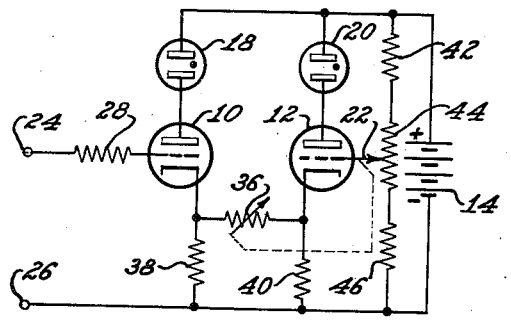
Fig. 3 is a schematic diagram of another modification of the signal level indicator of Fig. 1.
Figure 4:
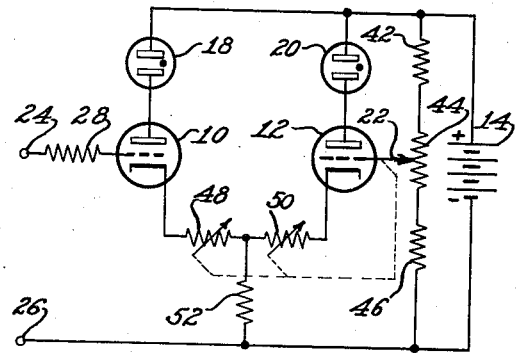
Fig. 4 is a schematic diagram of a modification of the signal level indicator of Fig. 3.

In many cases, it will be desired to extend the limits between the extinguishing potential differences required for the two lamps 18, 20. Figs. 3 and 4 show means which accomplish this result. In Fig. 3, there is shown a signal level indicator similar to Fig. 1 except for the fact that the common cathode impedance between the cathodes of the tubes 10, 12 comprises a "π" network. The cathodes of the tubes 10, 12 are connected to each other through a resistor 36. The cathodes of tubes 10 and 12 are also connected to the negative terminal of the voltage source 14, through resistors 38 and 40, respectively. A voltage divider comprising resistors 42, 44 and 46, in series with each other, is connected across the voltage supply 14. The reference voltage supplied to the tube 12 is taken from a selected point on a resistor 44 by means of the variable tap 22. In operation, the "π" coupling network, comprising resistors 36, 38 and 40, maintains relative sensitivity between the signal voltage and the reference voltage for different settings of the reference voltage. If the requirement is such that signal voltage shall match a fixed reference voltage within a specified difference, the resistors 36, 38 and 40 may be fixed. If, however, it is desired to determine the value of the signal voltage within a fixed percentage difference of an adjustable reference voltage, the resistor 36 may be a variable resistance which may be ganged to the variable tap 22 for movement therewith, as shown in Fig. 3.

The signal level indicator circuit of Fig. 4 is substantially the same as that shown in Fig. 3 except that the "π" network shown in Fig. 3 has been replaced by a T network. In Fig. 4, the cathodes of the tubes 10, 12 are connected to each other through resistors 48 and 50, in series with each other. The common junction between the resistors 48 and 50 is connected to the negative terminal of the voltage supply 14 through a resistor 52. The operation of the circuit of Fig. 4 is similar to that of Fig. 3. If it is desired to maintain the same sensitivity between the signal voltage applied to the tube 10 with respect to the reference voltage applied to the tube 12, for all levels of the latter reference voltage, the resistors 48 and 50 may be variable and ganged to the variable tap 22 for movement therewith.

Figure 5:
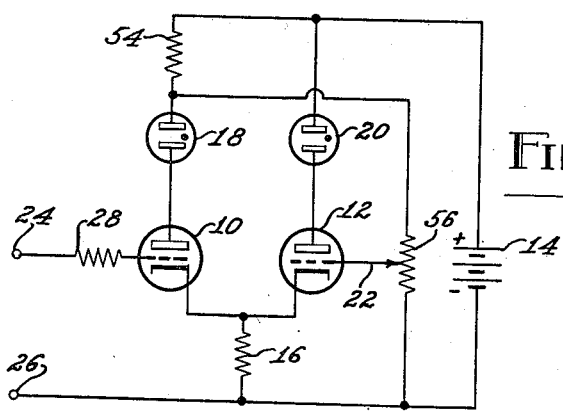
Fig. 5 is a schematic diagram of a further modification of the signal level indicator of Fig. 1.

If it is desired to increase the sensitivity of the signal level indicator, regeneration may be used to reduce the allowable potential differences required to extinguish one of the lamps. Fig. 5 illustrates such a modification. The signal level indicator of Fig. 5 is similar to the circuit shown in Fig. 1 except for the fact that a load resistor 54 is inserted between the positive terminal of the voltage source 14 and the lamp 18. A resistor 56 is connected to the junction between the resistor 54 and the lamp 18 and the negative terminal of the voltage source 14. The reference voltage applied to the tube 12 is taken from a selected point on the resistor 56 by means of the variable tap 22. The sensitivity of this circuit is increased by the feedback from the anode circuit of the tube 10 to the grid of the tube 12. In operation, if the signal voltage applied to the grid of the tube 10 is greater than the reference voltage applied to the grid of the tube 12, a negative going voltage will be fed back from the junction between the resistor 54 and the tube 18 to the grid of the tube 12 and thereby further increase the difference between the signal voltage of the reference voltage. It is also understood that if the signal voltage applied to the grid of the tube 10 is smaller than the reference voltage applied to the grid of the tube 12, the fed back signal to the grid of the tube 12 will be positive going, thereby increasing further the potential differences between the signal voltage and the reference voltage. The differential type amplifier having constant current characteristics is particularly suitable for the application of regeneration in that the gain may be greatly increased while maintaining good stability. Although the circuit arrangements described and illustrated are especially suitable for use with gas type lamps, filament type lamps may be substituted when desired provided adequate current can be accommodated by the tubes. For normal use, the greater efficiency and freedom from sudden burn out of the gas type lamps make them preferable.

Thus, it is seen that there has been provided, in accordance with the objects of the present invention, a signal level indicator comprising two electron discharge tubes having a common cathode circuit and a current responsive device individually connected in their anode circuits. When the voltage applied to the grid of one tube is substantially equal, within a desired db range, to the reference voltage applied to the grid of the other tube, both lamps will be lighted. If the signal voltage is greater or smaller than the reference voltage, one or the other of the lamps will be lighted. Under no conditions of normal operation will both lamps be extinguished. Several embodiments have been shown and described for varying the sensitivity of the signal level indicator by varying the ratio of the signal voltage to the reference voltage. An arrangement also has been shown and described whereby an excessive amount of grid current is prevented from flowing through the tube to which the signal voltage is applied by employing an electron tube in the cathode circuit and employing a cathode resistor for producing degeneration.

While the signal level indicator of the present invention has been described in connection with a D.-C. signal voltage, it is evident to those skilled in the art that A.-C. signals may be handled by using rectifier circuits, and pulsed signals may be used by employing peak reading circuits.

What is claimed is:

1. A signal level indicator circuit comprising a pair of electron discharge tubes each having at least a cathode, a control electrode, and an anode, neon lamps individually connected to each of said anodes, a common impedance connected to each of said cathodes, means to apply a source of unidirectional voltage across said lamps and said impedance, means to apply a reference voltage to a control electrode of one of said tubes, and means to apply a signal voltage to the control electrode of the other of said tubes.

2. A signal level indicator circuit as defined in claim 1 wherein said common impedance comprises an electron discharge tube, and means to bias said last-mentioned tube as a constant current tube.

3. A signal level indicator circuit as defined in claim 1 wherein said common impedance comprises an electron discharge tube having at least an anode, a control electrode, and a cathode, a resistor connected between said last-mentioned cathode and said voltage applying means, said last-mentioned anode being connected to the cathodes of said pair of electron discharge tubes, and means to apply a voltage to said last-mentioned control electrode.

4. A signal level indicator circuit as defined in claim 1 wherein said common impedance comprises a resistor connected between said cathodes, and resistors connected individually between each cathode and said voltage applying means.

5. A signal level indicator circuit as defined in claim 1 wherein said common impedance comprises a first resistor, a second resistor connected in series therewith, said first and second resistors being connected between said cathodes, and a third resistor connected between the junction of said first and second resistors and said voltage applying means.

6. A signal level indicator circuit comprising a pair of electron discharge tubes each having a grid, an anode circuit, and a common cathode circuit, a separate lamp in the anode circuit of each tube, means to apply a reference voltage to the grid of one of said tubes, means in series with said anode and cathode circuits to apply a source of unidirectional voltage thereacross, and means to apply a unidirectional signal voltage to the grid of the other of said tubes, whereby the flow of current in each anode circuit is controlled in response to the magnitude of said signal voltage.

7. A signal level indicator circuit as defined in claim 6 wherein said common cathode circuit comprises a third electron tube having at least an anode, a control electrode, and a cathode, said last-mentioned anode being connected to said cathodes of said pair of tubes, and means connected between said last-mentioned cathode and said last-mentioned control electrode to bias said last-mentioned control electrode.

8. A signal level indicator circuit as defined in claim 6 wherein said common cathode circuit comprises a first resistor connected between said cathodes, and a second and third resistor each connected between a cathode respectively and said means to apply a source of unidirectional voltage.

9. A signal level indicator circuit as defined in claim 6 wherein said common cathode circuit comprises a T-network of resistors having a first end connected to a cathode of one tube, a second end of said T-network connected to a cathode of the other of said tubes, and a third end of said T-network connected to said means to apply a source of unidirectional voltage.

10. A signal level indicator circuit as defined in claim 6 wherein the anode circuit of said other of said tubes comprises a first impedance between said lamp and said means to apply a unidirectional voltage, said means to apply a reference voltage comprises a second impedance having one end connected to the junction of said last-mentioned lamp and said first impedance and the other end connected to said means to apply a source of unidirectional voltage, and means to connect the grid of said one of said tubes selectively to a point on said second impedance.

JAMES S. HARRIS.

No references cited.